United States Patent [19]

Graber

[11] 4,194,576
[45] Mar. 25, 1980

[54] SHANK AND COULTER MOUNTING CLAMP

[76] Inventor: Harold J. Graber, Rte. 4, Hutchinson, Kans. 67501

[21] Appl. No.: 859,312

[22] Filed: Dec. 12, 1977

[51] Int. Cl.² .................. A01B 35/20; A01B 39/22
[52] U.S. Cl. .................................. 172/763; 172/166
[58] Field of Search ............... 172/166, 763, 707, 708, 172/138, 602, 551, 142; 403/389, 391, 399, 398

[56] References Cited

U.S. PATENT DOCUMENTS

| | | | |
|---|---|---|---|
| 57,007 | 8/1866 | Stillman | 172/602 |
| 616,450 | 12/1898 | Bransford | 172/602 |
| 2,101,317 | 12/1937 | Lemieux | 403/391 X |
| 2,420,551 | 5/1947 | Morkoski | 172/166 |
| 2,632,372 | 3/1953 | Williams | 172/142 X |
| 2,906,353 | 9/1959 | Rogers | 172/265 |
| 3,912,019 | 10/1975 | Baughman | 172/763 |

*Primary Examiner*—Richard J. Johnson
*Attorney, Agent, or Firm*—John H. Widdowson

[57] ABSTRACT

A shank and coulter mounting clamp for attaching to an angular shaped plow frame tube. The clamp securing a rolling coulter and rigid shank to the plow frame with the rolling coulter disposed in front of and adjacent the throat of the shank. The clamp providing for a uniform distribution of load forces transmitted from the shank and coulter to the plow frame.

4 Claims, 5 Drawing Figures

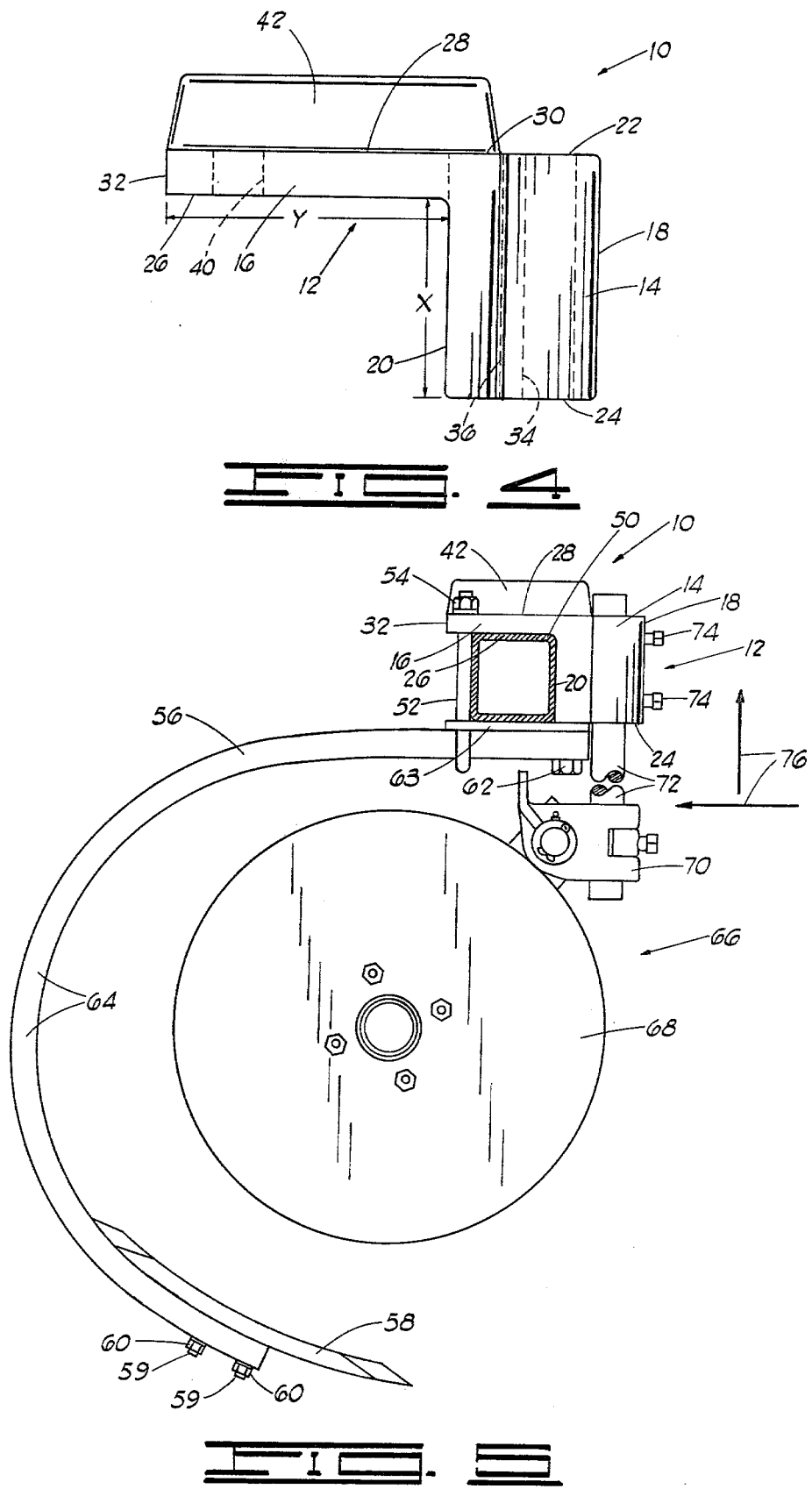

SHANK AND COULTER MOUNTING CLAMP

BACKGROUND OF THE INVENTION

The subject invention relates generally to a mounting clamp for mounting a rigid shank and rolling coulter to the frame of a plow and more particularly, but not by way of limitation, to a clamp that will allow mounting individually the shank or the coulter or both together with the coulter disposed in front of the shank and adjacent the throat of the shank.

Heretofore there have been various types of coulter and shank mounting attachments and in particular, a spring shank mounting disclosed in U.S. Pat. No. 2,906,353 to Rogers and a gauge wheel and coulter assembly disclosed in U.S. Pat. No. 2,420,551 to Morkoski. Also, a sub-soiling attachment for disc plows is disclosed in U.S. Pat. No. 3,642,333 to Eisenhardt. While these patents disclose various means of attaching shanks and coulters to a plow frame, none of them specifically disclose the unique structure and advantages of the subject invention as described herein.

SUMMARY OF THE INVENTION

The subject invention provides a mounting clamp for securing a rigid shank or a rolling coulter individually on a plow frame and in particular, the combination of mounting the rolling coulter and rigid shank together on the clamp with the coulter disposed directly in front of the rigid shank and disposed in the throat area of the shank.

The clamp provides means for slidably adjusting the shaft of the coulter on the clamp so that the cutting depth of the coulter in the ground surface may be varied.

The mounting clamp positions the rolling coulter in front of and in the throat of the rigid shank so that during the plowing of the ground surface vegetation is cut or chopped by the rolling coulter prior to becoming entangled around the cutting surface and throat area of the shank. This allows the shank to work at the desired full depth in the ground surface.

The mounting clamp is simple in design, made of a heavy casting for increased wear-life and mounts directly on top and front of the angular shaped plow frame tube giving greater strength and less stress on the plow frame. By clamping directly on top and front of the plow frame tube, the load forces are spread equally across the surface area of the plow frame reducing point contact and high load areas, thereby reducing damage and collapse of the plow frame due to unequal stresses thereon.

The shank and coulter mounting clamp for mounting on an angular shaped plow frame tube includes an inverted "L" shaped bracket. The bracket includes a vertical arm received against the front of the frame tube. The vertical arm includes a coulter shaft aperture for receiving the coulter shaft of the rolling coulter. Disposed adjacent and parallel to the coulter shaft aperture is a shank bolt aperture for receiving a bolt attached to the rigid shank. The bracket further includes a horizontal arm integrally attached to the top of the vertical arm and received against the top of the frame tube. The horizontal arm includes "U" bolt apertures for receiving the ends of a "U" bolt received around a portion of the rigid shank.

The advantages and objects of the invention will become evident from the following detailed description when read in conjunction with the accompanying drawings which illustrate the preferred embodiments of the invention.

BRIEF DESCRIPTION OF THE DRAWINGS

In FIG. 4 a side view of the clamp is illustrated.

In FIG. 5 a side view of the clamp is illustrated attached to a portion of the angular shaped plow frame tube with the rolling coulter and rigid shank attached to the clamp.

DETAILED DESCRIPTION OF THE DRAWINGS

Figure 1:
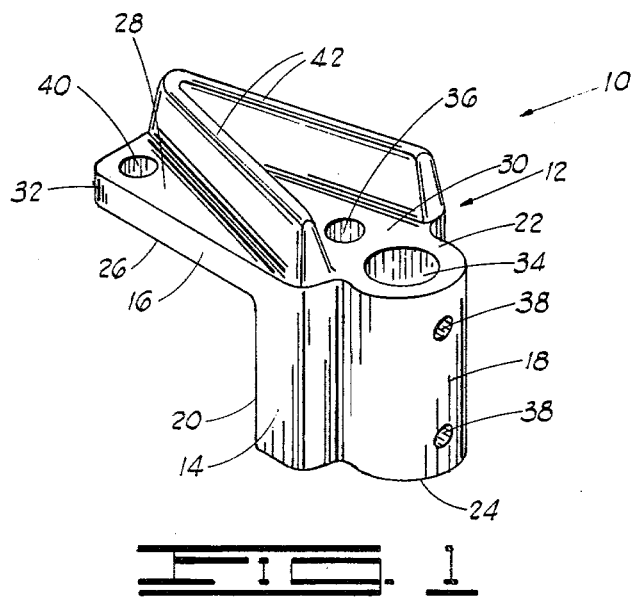
In FIG. 1 a perspective view of the shank and coulter mounting clamp is illustrated.

In FIG. 1 the shank and coulter mounting clamp is designated by general reference numeral 10. The clamp 10 includes an inverted "L" shaped bracket 12 having a vertical arm 14 and a horizontal arm 16.

The vertical arm includes a front portion 18, a back portion 20, a top portion 22, and a bottom portion 24. The horizontal arm 16 includes a bottom portion 26, a top portion 28, a front portion 30, and a rear portion 32.

The vertical arm 14 further includes a coulter shaft aperture 34 through the front portion 18 of the arm 14. Disposed adjacent the back portion 20 of the arm 14 is a vertical shank bolt aperture 36. The front portion 18 of the arm 14 further includes a pair of set screw apertures 38 communicably connected to the coulter shaft aperture 34.

Near the back portion 32 of the horizontal arm 16 are a pair of "U" bolt apertures 40. The apertures 40 are both seen in FIG. 2. The clamp 10 is made of a cast metal or the like and further includes a "V" shaped strengthening web 42 intergrally formed in the top portion 28 of the horizontal arm 16 and part of the top portion 22 of the vertical arm 14. Because of the heavy loads and torque placed on the clamp 10 when it is secured to a plow frame, the strengthening web 42 provides further strength in preventing premature failure of the clamp due to excessive and continuous loading.

Figure 2:
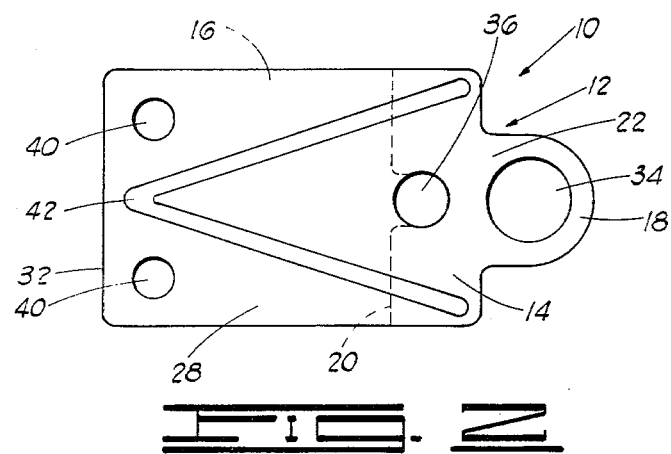
In FIG. 2 a top view of the clamp is illustrated.

In FIG. 2 a top view of the clamp 10 is seen. In this view, the top of the coulter shaft aperture 34 and shank bolt aperture 36 can be seen extending through the length of the vertical arm 14. The back portion 20 of the vertical arm 14 is illustrated in dotted lines with a portion of the aperture 36 adjacent the back portion 20 of the vertical arm 14. Also seen in this view are the "U" bolt apertures 40 disposed near the back portion 32 of the horizontal arm 16.

Figure 3:
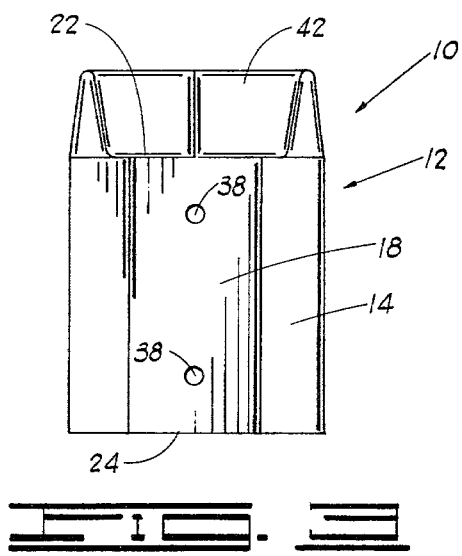
In FIG. 3 a front view of the clamp is illustrated.

In FIG. 3 a front view of the clamp 10 is seen. In this view, the front portion 18 of the vertical arm 14 can be seen with the set screw apertures 38 extending through and communicably connected to the coulter shaft aperture 34.

In FIG. 4 a side view of the clamp 10 is illustrated. In this view, the apertures 34, 36, and 40 are shown in dotted lines with center lines indicated therein for showing the location of the vertical apertures in the clamp 10. It should be noted in this view the rear portion 20 of the vertical arm 14 has an overall height of a dimension X. The dimension X corresponds with the overall height of an angular shaped plow frame tube 50 shown in FIG. 5. By having a flat back portion 20 dimensioned to be equal to the overall height of the frame tube 50, the loads placed by the clamp 10 against the tube 50 are evenly distributed across the engaged surface of the tube 50.

The bottom portion 26 of the horizontal arm 16 has a flat surface for bearing on top of the frame tube 50. The length of the bottom portion 26 is Y. The dimension Y is greater than the width of the tube 50. The rear portion 32 extends outwardly from the width of the tube 50 for receiving the ends of a "U" bolt 52, shown in FIG. 5. The "U" bolt apertures 40 are positioned to be adjacent the rear of the frame tube 50 so that when the "U" bolt 52 is secured to the bracket 12, the "U" bolt 52 is engaged against the back of the tube 50.

In FIG. 5 the clamp 10 is shown with the bracket 12 secured to the angular shaped plow frame tube 50 with the back portion 20 of the vertical arm 14 disposed against the front of the tube 50. Also shown is the bottom portion 26 of the horizontal arm 16 bearing against the top of the tube 50 and secured to the ends of the "U" bolt 52 by "U" bolt nuts 54. In this view, the "U" bolt 52 can be seen received around a portion of a chisel shank 56. The chisel shank 56 includes a chisel point 58 secured to one end of the shank 56 by a pair of bolts 59 and nuts 60. The other end of the shank 56 is attached to the bracket 12 by a shank bolt 62 received through an aperture in the chisel shank 56 and extending upwardly through the shank bolt aperture 36 where it is attached to a nut. The nut is not shown in the drawings. A portion of the top of the shank 56 is tightened against a shank plate 63 which has apertures therein for receiving the shank bolt 62 and "U" bolt 52 therethrough, the plate 63 acts as a bearing surface for distributing the load across the bottom of the tube 50.

The shank 56 is formed in a "C" shape and includes a throat area 64. This area is in the rearward portion of the shank 56. The throat 64 of the shank 56 is the area of the shank that cuts through the top of the ground surface. This area generally engages the vegetation growing upwardly from the top of the ground surface which often becomes entangled around the shank 56. To prevent the bunching or clumping of vegetation around the shank 56, a rolling coulter 66 is disposed in front of and adjacent the throat 64 of the shank 56. The rolling coulter blade 68 cuts the vegetation, weeds, etc., thereby preventing the collection of the material on the shank 56.

The coulter 66 includes a coulter blade 68 attached to a spring biased connecting arm 70 which in turn is attached to the bottom of a coulter mounting shaft 72. In this illustration, the mounting shaft 72 is vertically disposed with the top of the shaft received in the coulter shaft aperture 34. By raising and lowering the shaft 72 in the aperture 34, the depth of the coulter blade 68 may be adjusted for the desired depth of cut in the ground surface. When this adjustment has been made, set screws 74 are received in the set screw apertures 38 and tightened against the shaft 72 in the aperture 34.

It should be noted in FIG. 5 that as the shank 56 and coulter blade 68 are urged to the right in a forward direction and downwardly into the ground surface when the plow frame is pulled along the ground surface, equal and opposite forces indicated by arrows 76 urge the blade 68 and shank 56 to the rear and upward. This force provides a twisting or torque force against the clamp 10. As can be appreciated by the compact design of the clamp 10 with the unique "L" shaped feature of the bracket 12, these forces are distributed equally around the surface area of the angular shaped plow frame tube 50.

Changes may be made in the construction and arrangement of the parts or elements of the embodiment as disclosed herein without departing from the spirit or scope of the invention as defined in the following claims.

I claim:

1. A shank and coulter mounting clamp for attaching to an angular shaped plow frame tube and securing a rolling coulter and a rigid shank to the plow frame with the rolling coulter disposed in front of and adjacent the throat of the shank, the clamp comprising;
   an inverted "L" shaped bracket, said bracket including
   a vertical arm having a front portion, a back portion, a top portion, and a bottom portion, the vertical arm having a vertical coulter shaft aperture therethrough for receiving a coulter shaft of the rolling coulter, the vertical arm further including a vertical shank bolt aperture adjacent the back portion of the vertical arm for receiving a shank bolt attached to the rigid shank; and
   a horizontal arm integrally attached to the top portion of the vertical arm, the horizontal arm having a top portion, a bottom portion, a front portion, and a back portion, the horizontal arm having "U" bolt apertures therethrough for receiving the ends of a "U" bolt; and
   a "V" shaped strengthening web integrally formed in the top portion of the vertical arm and the horizontal arm for providing added strength in the structure of the clamp.

2. The clamp as described in claim 1 further including set screw apertures disposed in the front of the vertical arm and communicably connected to the coulter shaft aperture for receiving set screws therein and securing the coulter shaft in the coulter shaft aperture.

3. The clamp as described in claim 1 wherein the vertical arm back portion of the clamp is constructed and adapted so that when mounted it is received against the front of the frame tube, the back portion having a height equal to the height of the frame tube on which it is to be mounted for distributing load forces equally across the height of the frame tube when it is mounted thereon.

4. The clamp as described in claim 1 wherein the horizontal arm bottom portion of the clamp is constructed and adapted so that when mounted it has a width greater than the width of the frame tube with the "U" bolt apertures adjacent the rear of the frame tube so that when said "U" bolt is attached thereto, the "U" bolt is disposed when mounted against the rear of the frame tube.

* * * * *